(12) United States Patent
Zimmerman et al.

(10) Patent No.: US 11,002,394 B2
(45) Date of Patent: May 11, 2021

(54) QUICK CONNECT JOINT

(71) Applicant: NELSON IRRIGATION CORPORATION, Walla Walla, WA (US)

(72) Inventors: Mathew L. Zimmerman, Walla Walla, WA (US); Craig B. Nelson, Walla Walla, WA (US); Chad D. Leinweber, Walla Walla, WA (US); Joseph Daniel Sinden, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 483 days.

(21) Appl. No.: 15/951,740

(22) Filed: Apr. 12, 2018

(65) Prior Publication Data
US 2019/0316716 A1    Oct. 17, 2019

(51) Int. Cl.
*F16L 37/12* (2006.01)
*F16L 37/20* (2006.01)

(52) U.S. Cl.
CPC ........... *F16L 37/1225* (2013.01); *F16L 37/20* (2013.01)

(58) Field of Classification Search
CPC ......... F16L 23/036; F16L 23/02; F16L 23/12; F16L 37/1225; F16L 37/12; F16L 37/20; F16L 37/18
USPC .......................... 285/308, 312, 325, 326, 412
See application file for complete search history.

(56) References Cited

U.S. PATENT DOCUMENTS

| | | | | |
|---|---|---|---|---|
| 1,493,221 A | * | 5/1924 | Northrup | F16L 37/20 285/27 |
| 2,256,845 A | * | 9/1941 | Lanninger | F16L 37/20 285/5 |
| 2,996,318 A | * | 8/1961 | Gravert | E05B 75/00 285/358 |
| 3,141,686 A | * | 7/1964 | Smith | F16L 23/02 277/608 |
| 3,578,362 A | * | 5/1971 | Cauthery | F16L 47/20 285/110 |
| 3,625,548 A | * | 12/1971 | Boehm | F16L 37/20 285/27 |
| 3,957,292 A | | 5/1976 | Diggs | |
| 3,966,233 A | | 6/1976 | Diggs | |

(Continued)

FOREIGN PATENT DOCUMENTS

CN    2184620 Y    12/1994
CN    203752007 U    8/2014
(Continued)

OTHER PUBLICATIONS

Chinese Office Action dated Oct. 10, 2020 issued in Chinese Patent Application No. 201910287934.0 and English translation, 23 pp.

*Primary Examiner* — Aaron M Dunwoody
(74) *Attorney, Agent, or Firm* — Nixon & Vanderhye P.C.

(57) ABSTRACT

A quick connect joint includes a base with first and second lock receivers on opposite sides of the base, and a connection plate including first and second engagement members engageable with the first and second lock receivers, respectively. The first engagement member is displaceable between a release position and lock position, and the first engagement member is rotatable between an insert position and a connect position. The quick connect joint creates a safe and reliable connection.

21 Claims, 7 Drawing Sheets

(56) References Cited

U.S. PATENT DOCUMENTS

| | | | |
|---|---|---|---|
| 3,971,573 A | 7/1976 | Clements | |
| 3,973,732 A | 8/1976 | Diggs | |
| 4,017,958 A | 4/1977 | Diggs | |
| 4,135,738 A | 1/1979 | Clements | |
| 4,278,279 A | 7/1981 | Zimmerman | |
| 4,637,641 A * | 1/1987 | Kennedy, Jr. | F16L 21/04 251/148 |
| 5,709,415 A | 1/1998 | Witter | |
| 5,947,386 A | 9/1999 | Dick et al. | |
| 6,116,527 A | 9/2000 | Granger et al. | |
| 6,682,106 B2 | 1/2004 | Parker | |
| 8,573,509 B2 | 11/2013 | Cole | |
| 9,592,518 B2 | 3/2017 | Drechsel | |
| 9,877,439 B1 | 1/2018 | McHugh | |
| 10,774,967 B1 * | 9/2020 | Corzo | F16L 37/18 |
| 2011/0176865 A1 * | 7/2011 | Colby | F16L 23/036 403/324 |
| 2013/0256427 A1 | 10/2013 | Steingass et al. | |
| 2019/0145565 A1 * | 5/2019 | Furcoiu | F16L 21/08 285/308 |

FOREIGN PATENT DOCUMENTS

| | | |
|---|---|---|
| CN | 203847875 U | 9/2014 |
| CN | 203993746 U | 12/2014 |
| CN | 206468955 U | 9/2017 |
| CN | 210545938 U | 5/2020 |

\* cited by examiner

QUICK CONNECT JOINT

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND

The invention relates to a quick connect joint for connecting a first part to a second part and, in an exemplary application, the invention relates to a quick connect joint for connecting a water pipe to a sprinkler.

There are many different "quick connections" used in the irrigation industry. These connections enable the user to irrigate large areas with fewer sprinklers and remove the sprinklers when not in use. There are issues that come up when dealing with portable sprinklers. The first is safety, wherein many of the current connectors can be connected and/or disconnected improperly. This can be a danger to the user moving these sprinklers because when they open the valve and pressurize the system, the sprinkler may be launched into the air due to the connection not being properly engaged. Many of them can also be opened under pressure and can send the sprinkler flying. Existing quick connectors include, for example, cam lock, ring lock, Certa-set, and ball and socket connectors.

The Cam-lock connector utilizes two over center cams that rotate into a groove that is cut into the male side of the connection. These cams pull the connection together and apply positive pressure on the seal that is seated inside the female connector. There are some potential dangers with using the cam lock system. If both cams are not fully rotated down, there is a possibility of the connection blowing apart and potentially injuring the user. The cams can also be released under water/fluid pressure, which is dangerous because if the sprinkler is plugged and the irrigator releases the cams, this can cause the sprinklers to release and be launched into the air.

The ring lock connector utilizes a male and female coupler that is joined with a "ring" that holds the two together. These rings either have an over center cam latch or a bolt connection. The over center cam is more of a portable solution to allow for quick assembly and disassembly. The over center cam latch ring lock, however, can be opened while under water/fluid pressure, which can cause the connection to separate and injure the user. It also can be latched while the pipe is misaligned, which can cause the connection to fail and separate.

The Certa-set connector utilizes a male and female coupler that is held together with a plastic spline that is inserted in a slot which keeps the connection together. This connection can also be opened under water/fluid pressure, and if the user forgets to install the plastic spline, the connection can come apart while under pressure and launch the sprinkler into the air.

The ball and socket connector uses a male and female connection that is held together with two clamps that pull the connection together. If the latches are not properly hooked on the lip of the female part, this connection can come apart when the system is pressurized.

BRIEF SUMMARY

It would be desirable to provide a quick connect joint suitable for a pressurized irrigation application that overcomes the drawbacks with existing connectors.

The quick joint connector of the described embodiments incorporates a base, a connection plate, and an over center cam latch. The connection plate has a tab that protrudes out the back that is engageable in a slot in the base. A T-bar is associated with the over center latch and is aligned with a slot in the base. The connection plate is engaged with the base, the over center latch is rotated ninety degrees until the T-bar is perpendicular to the slot in the base, and the cam latch can then be rotated to clamp down the connection plate to the base.

In an exemplary embodiment, a quick connect joint for connecting a first part to a second part includes a base securable to the first part, a connection plate securable to the second part, and a cam latch. The base includes an engaging surface with a T-bar slot defined in the engaging surface, and the base includes a tab opening defined by a bracket extending from the engaging surface. The connection plate includes a tab member engageable with the tab opening of the base. The cam latch extends through the connection plate and includes a cam actuator on one side of the connection plate coupled with a T-bar and a T-bar shaft on an opposite side of the connection plate. The T-bar shaft is positionable in the T-bar slot with the T-bar on a side of the base opposite from the engaging surface. The cam actuator is displaceable between a release position in which the T-bar is disengaged from the base and a lock position in which the T-bar is engaged with the base.

The cam actuator may be rotatable between an insert position in which the T-bar is aligned with a longitudinal axis of the T-bar slot and a connect position in which the T-bar is not aligned with the longitudinal axis of the T-bar slot. One of the base and the connection plate may include an insert member, and the other of the base and the connection plate may include an insert opening. The insert member engages the insert opening when the connection plate is coupled with the base. The bracket defining the tab opening may be integral with the base. The tab member may include a groove on an upper surface that is engageable with the bracket. The base may include a base socket with internal threads for connecting to the first part, and the connection plate may include a connection plate socket with internal threads for connecting to the second part. In some embodiments, the tab and the cam latch are positioned on opposite sides of the connection plate. The cam actuator may include a cam handle coupled with a cam member, and the cam latch may additionally include a cam insert positioned between the cam member and the connection plate and engaged with the cam member. The cam member and the cam insert may be cooperatively shaped such that rotation of the cam member relative to the cam insert draws the T-bar shaft and the T-bar toward the cam member. The connection plate may include a seal on an underside thereof facing the engaging surface of the base. The base may include at least one pad secured on the engaging surface.

In another exemplary embodiment, a method of securing a quick connect joint includes the steps of (a) inserting the tab of the connection plate into the tab opening of the base; (b) with the cam latch in a release position, pivoting the connection plate into engagement with the base and inserting the T-bar shaft into the T-bar slot; and (c) displacing the cam latch from the release position to a lock position to thereby draw the T-bar into engagement with the base. Step (b) may be practiced with the cam actuator in a release position such that the T-bar is aligned with a longitudinal axis of the T-bar slot, wherein the method further includes, before step (c), rotating the cam actuator from the release position to a connect position in which the T-bar is not aligned with the longitudinal axis of the T-bar slot. The method may further include engaging a groove in an upper surface of the tab with the tab opening in the base, and the method may include sealing the engagement between the connection plate and the base. Step (b) may include engaging the insert member with the insert opening.

In yet another exemplary embodiment, a quick connect joint includes a base including first and second lock receivers on opposite sides of the base, and a connection plate including first and second engagement members engageable with the first and second lock receivers, respectively. The first engagement member is displaceable between a release position and lock position, and the first engagement member is rotatable between an insert position and a connect position. The base may include a cylindrical insert member protruding from an engaging surface of the base, and the connection plate may include an insert opening sized to receive the insert member, wherein the insert member engages the insert opening when the connection plate is engaged with the base. The first engagement member may include a cam latch extending through the connection plate, where the cam latch has a cam actuator on one side of the connection plate coupled with a T-bar and a T-bar shaft on an opposite side of the connection plate, and where the T-bar shaft and the T-bar are engaged with the first lock receiver when the cam actuator is displaced to a lock position. The connection plate may include a seal on an underside thereof facing the base, and the second engagement member may include a tab member, where the second lock receiver may include a tab opening defined by a bracket. The bracket may include posts extending from the base and a cross bar secured on the posts.

In some embodiments, the first lock receiver includes a cam groove, and the first engagement member includes a cam engageable with the groove in the lock position. The first engagement member may include the cam disposed at a distal end of a rotatable lever. The connection plate may include a plate pair disposed on opposite sides of the rotatable lever and including through holes, where the lever includes a locking hole that is positioned in alignment with the through holes in the plate pair in the lock position.

BRIEF DESCRIPTION OF THE DRAWINGS

These and other aspects and advantages will be described in detail with reference to the accompanying drawings, in which.

DETAILED DESCRIPTION

Figure 1:
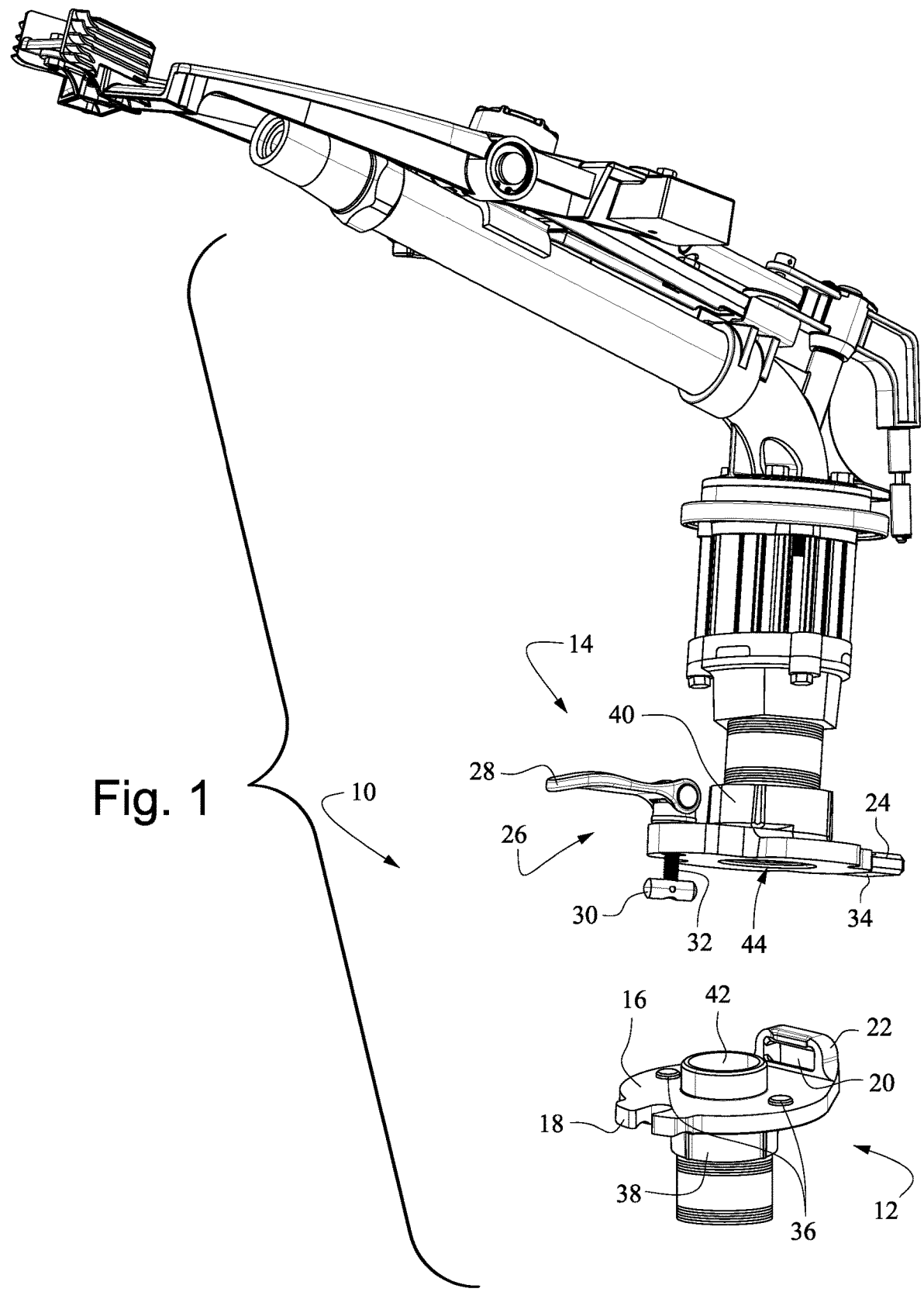
FIG. 1 shows the quick connect joint in an exemplary application connecting a water pipe to a sprinkler.
Figure 2:
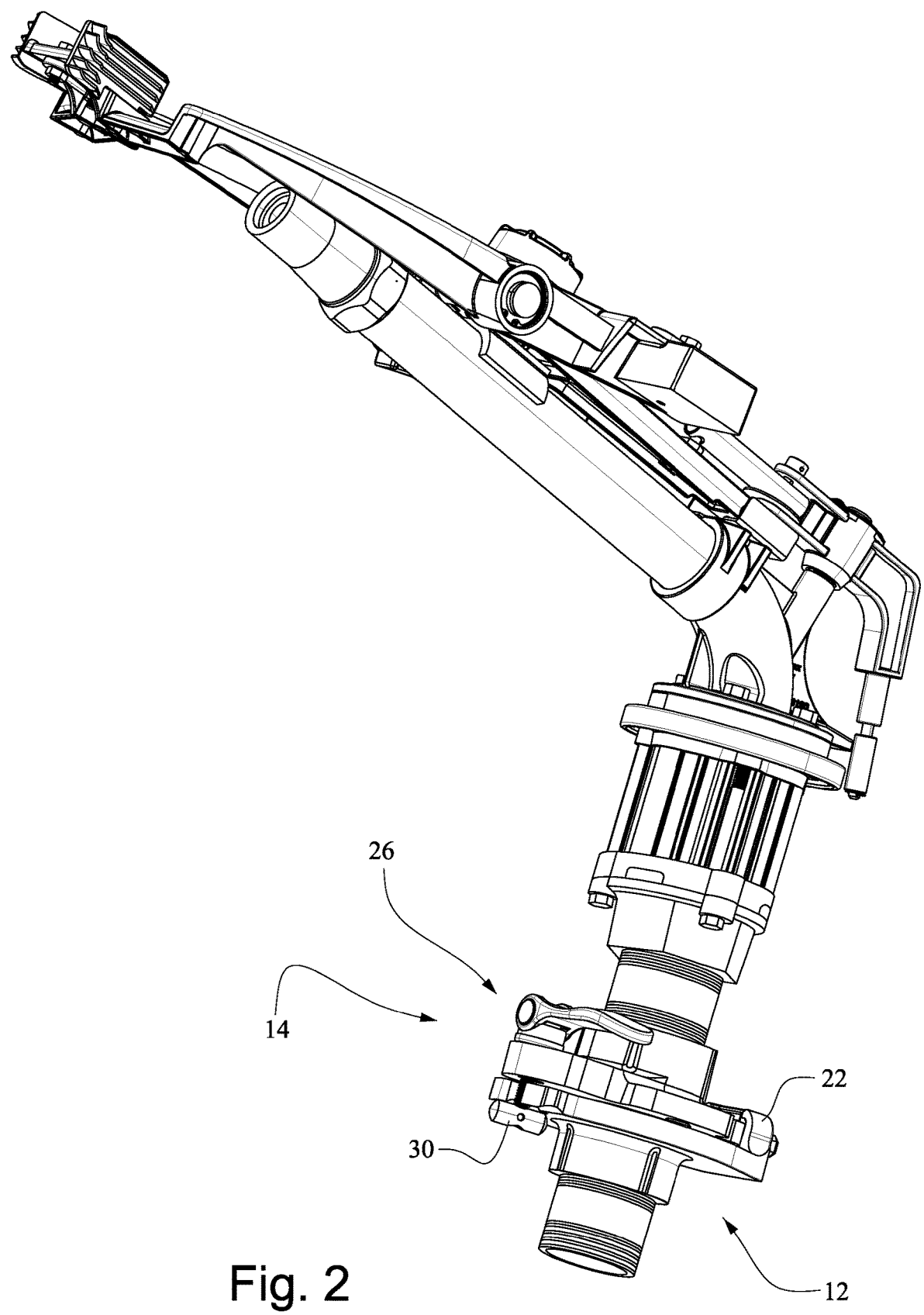
FIG. 2 shows the exemplary application of FIG. 1 in a connected and locked configuration.

With reference to the drawings, the quick connect joint 10 according to the described environments is shown in an exemplary application to an irrigation system, where the quick connect joint connects a water pipe in which water flows under pressure to a sprinkler. The illustrated application is exemplary, and the quick connect joint may be applicable in other applications as would be apparent to those of ordinary skill in the art. The invention is not necessarily meant to be limited to the illustrated application.

The quick connect joint 10 includes a base 12 securable to a first part and a connection plate or plate assembly 14 securable to a second part. As noted, in the illustrated exemplary application, the first part may be a water pipe in which water flows under pressure, and the second part may be a sprinkler.

The base 12 includes an engaging surface 16 with a T-bar slot 18 defined in the engaging surface 16. As shown, the T-bar slot 18 is defined in a periphery of the engaging surface 16. The base 12 also includes a tab opening 20 defined by a bracket 22 extending from the engaging surface 16. The bracket 22 defining the tab opening 20 may be integral with the base 12.

Figure 3:
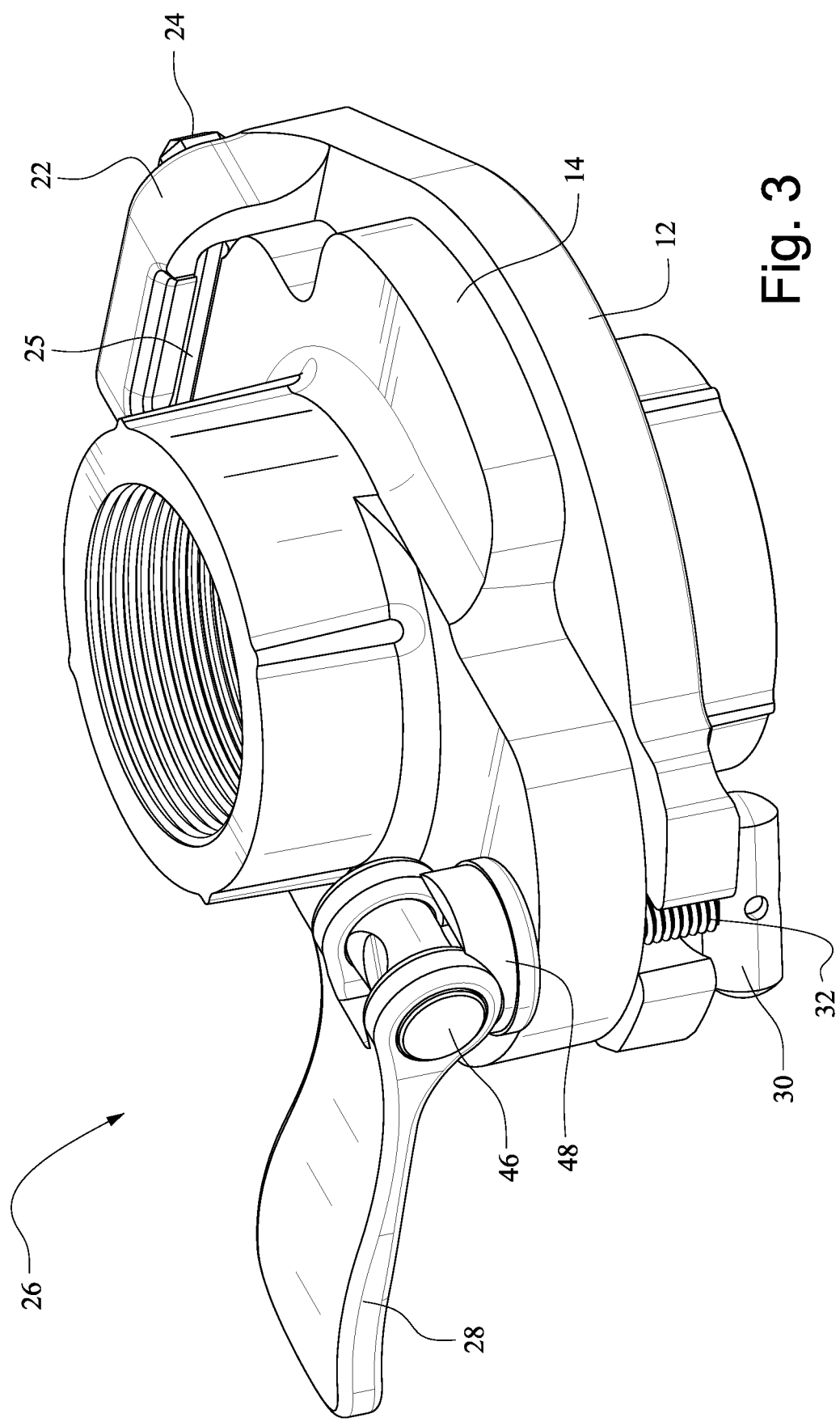
FIG. 3 is a close-up perspective view of the quick connect joint in the connected configuration.

The connection plate 14 is provided with a tab member 24 that protrudes from the connection plate 14. The tab member 24 is sized and shaped to fit in the tab opening 20 of the base 12. The tab member 24 is thus engageable with the bracket 22 in the tab opening 20 of the base 12. As shown in FIG. 3, the tab member 24 may be provided with a groove 25 on an upper surface. The groove 25 is engageable with the bracket 22 to hold the connection plate 14 in place in the event that pressure is applied to the connection plate 14 (e.g., by opening a valve) before the connection plate is locked down.

Figure 4:
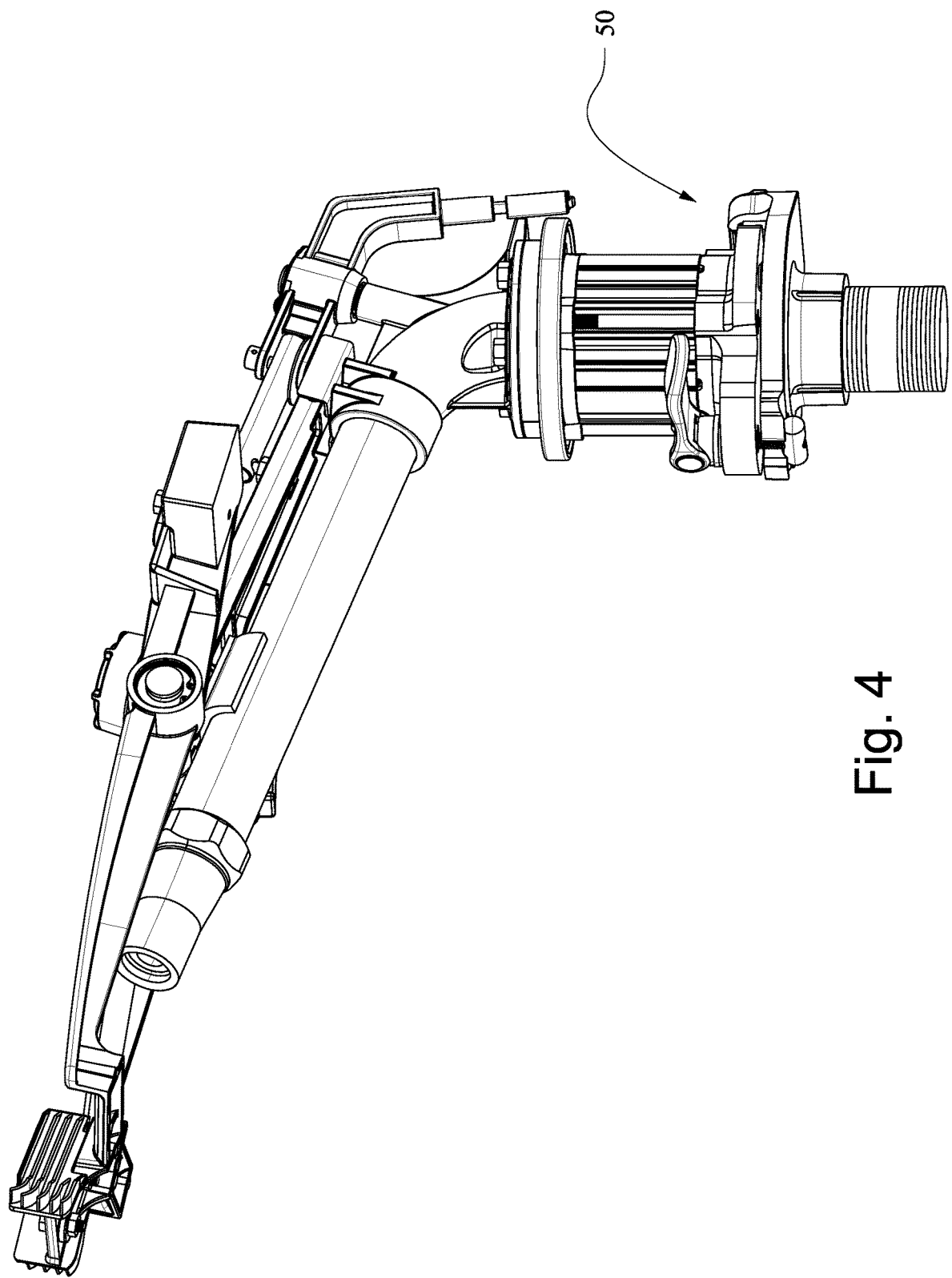
FIG. 4 shows a variation of the quick connect joint assembly.

Any suitable construction may be used for securing/receiving the tab member 24 when assembling the quick connect joint. An exemplary alternative is shown in FIG. 4. This configuration operates the same as described above with the over center latch. The top connection plate has removed the 2-inch NPT connection, and has geometry that allows for a direct-bolt connection 50 to a sprinkler such as the Nelson Big Gun™. This shortens the overall assembly, and since the bolts are covered in the connection plate, allows for a sprinkler such as the Nelson Big Guns™ to be placed in areas that may have issues with theft.

A cam latch 26 extends through the connection plate 14. As shown, the cam latch 26 and the bracket 22 are positioned on opposite sides of the connection plate 14. The cam latch 26 includes a cam actuator or handle 28 on one side of the connection plate 14 coupled with a T-bar 30 and T-bar shaft 32 on an opposite side of the connection plate 14. The cam actuator 28 is displaceable between a release position in which the T-bar 30 is lowermost and a lock position in which the T-bar 30 is raised to an engagement position.

The connection plate 14 may be provided with a seal member 34 such as a U-cup seal, which provides a quality seal in varying conditions. Two pads 36 may be secured on the engaging surface 16 of the base plate 12. The pads 36 are raised above the engaging surface 16 to allow for dirt and small debris to be present without impeding the seal between the base 12 and the connection plate 14.

The base 12 may be provided with a base socket 38 with internal threads for connecting to the first part. Similarly, the connection plate 14 may be provided with a connection plate socket 40 with internal threads for connecting to the second part. As shown in FIG. 1, the base 12 may also be provided with a cylindrical insert member 42 protruding from the engaging surface 16 of the base. The connection plate 14 includes an insert opening 44 that is sized to receive the insert member 42. The insert member 42 engages the insert opening 44 when the connection plate 14 is engaged with the base 12. The insert member 42 and the insert opening 44 may be reversed between the connection plate 14 and the base 12.

With reference to FIG. 3, the cam actuator/handle 28 is coupled with a cam member 46, which rotates with the handle 28. A cam insert 48 is positioned between the cam member 46 and the connection plate 14 and engaged with the cam member 46. The cam member 46 and the cam insert 48 are cooperatively shaped such that rotation of the cam member 46 by the handle 28 or the like relative to the cam insert 48 draws the T-bar shaft 32 and the T-bar 30 toward the cam member 46.

The cam actuator 28 is thus rotatable about an axis through the cam member 46 generally parallel to a plane of the connection plate 14. The cam actuator/handle 28 is also rotatable about a vertical axis through the connection plate 14 and the base 12 in alignment with the T-bar shaft 32. The cam actuator 28 is thus rotatable between an insert position in which the T-bar 30 is aligned with a longitudinal axis of the T-bar slot 18 (FIG. 1) and a connect position in which the T-bar 30 is not aligned with the longitudinal axis of the T-bar slot 18.

To secure the quick connect joint 10, the tab 24 of the connection plate 14 is inserted into the tab opening 20 of the base 12. With the cam latch 26 in the release position, where the T-bar 30 is aligned with the longitudinal axis of the T-bar slot 18, the connection plate 14 is pivoted into engagement with the base 12, and the T-bar shaft 32 is inserted into the T-bar slot 18. Subsequently, the cam actuator 28 may be rotated from the release position to the connect position in which the T-bar 30 is not aligned with the longitudinal axis of the T-bar slot 18. The cam latch 26 via the actuator 28 may then be displaced over center from the released position to a lock position to thereby draw the T-bar 30 into engagement with the base 12.

The tab 24 on the back of the connection plate 14 facilitates alignment of the quick connect joint. The user merely slides the tab 24 into the opening 20 in the base 12 until it stops, and the connection plate 14 is then pivoted down onto the base 12. The tab 24 also acts as an initial safety feature in the connection. The groove 25 cut in the top of the tab member 24 serves to prevent the connected part (e.g., the sprinkler) and the connection plate 14 from being launched in the event that a valve is opened without properly connecting the T-bar 30. Rather, the groove 25 in the tab member 24 would engage the bracket 22 to hook the part and prevent launching. This would allow the user enough time to grab hold of the sprinkler and close the valve. The over center cam latch 26, T-bar 30, and T-bar shaft 32 provide an additional safety feature. If the cam latch 26 is unlatched while the sprinkler is under pressure or the like, the connection plate 14 will lift up until the T-bar connection catches. In the exemplary application, a water leak will result, but the structure would prevent the part from coming off the base 12. The T-bar can also keep the connection together if the user forgets to lock down the cam latch. With both the cam latch and the tab on opposite sides of the connection plate, the assembly creates a connection that is difficult to separate under pressure, providing added protection to the user.

Figure 5:
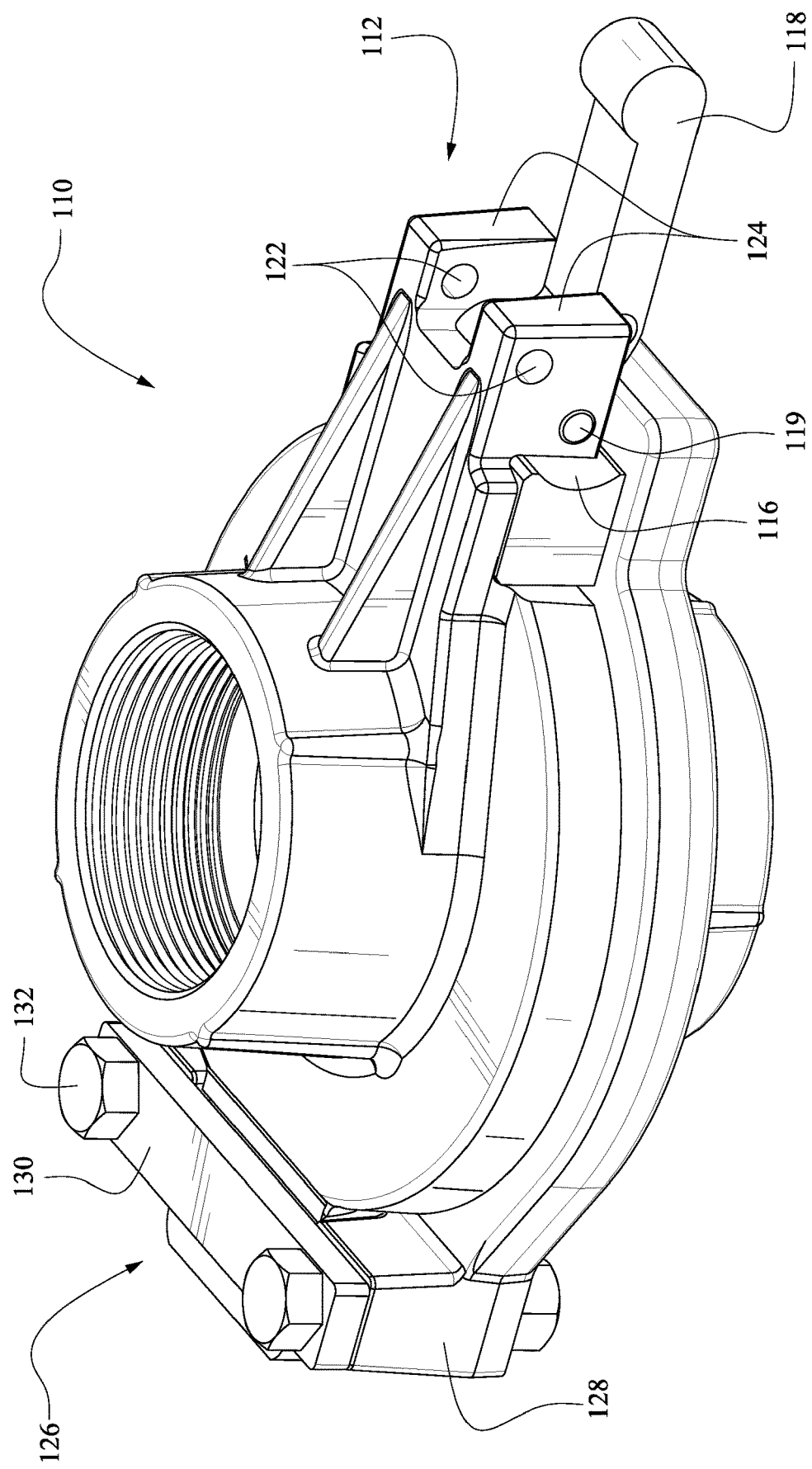
FIG. 5 shows an alternative embodiment with a modified locking mechanism and tab opening.
Figure 6:
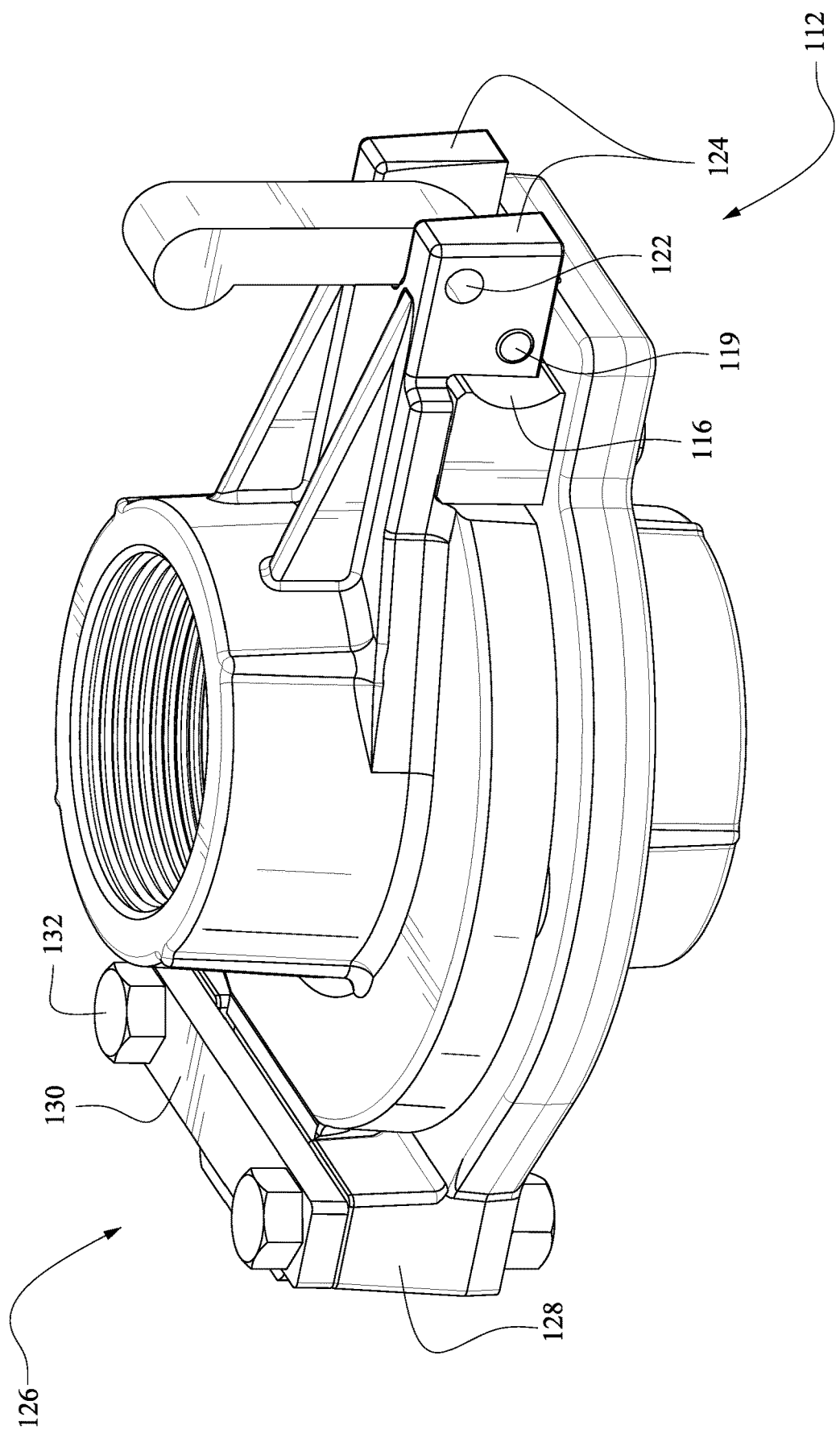
FIG. 6 shows the embodiment of FIG. 5 in a locked position.
Figure 7:
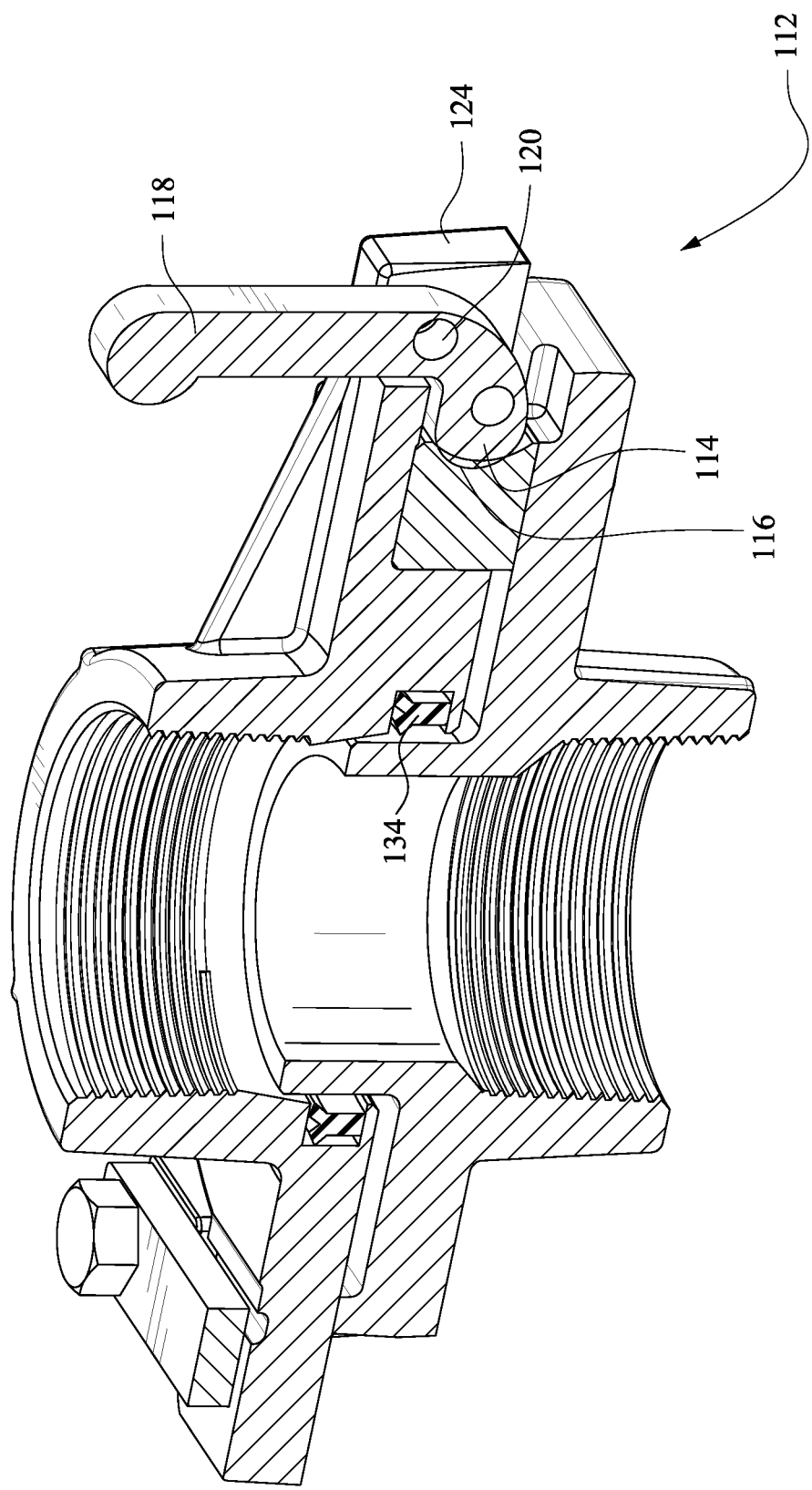
FIG. 7 is a cross-sectional view of the FIG. 5 embodiment.

FIGS. 5-7 show an alternative embodiment. This embodiment utilizes many of the same structural components for the secure and safe connection. The quick connect joint 110 in this embodiment includes a locking mechanism 112 utilizing a single over center cam 114 (see FIG. 7) that rotates with a lever 118 and engages within a semicircular cam groove 116. The lever 118 is secured to the base and pivotally mounted between a plate pair 124 via a pivot pin 119. The single cam 114 helps to decrease the amount of time spent connecting the sprinklers to the base. The lever 118 also has a locking hole 120 to allow for a pin or lock to be installed in through holes 122 in the connection plate. That is, in the lock position, the locking hole 120 in the lever 118 is aligned with the through holes 122 in the plate pair 124. This allows the user to ensure that the sprinkler is much more difficult to steal or have an accidental opening of the connection due to livestock rubbing against the riser.

FIG. 5 shows the lever 118 in the down position such that the connection plate could be removed from the base, and the cam 114 is not engaged in the semicircular groove 116. FIG. 6 shows the lever 118 rotated up and the cam 114 engaged in the groove 116.

With continued reference to FIGS. 5 and 6, a revised bracket 126 includes posts 128 and a cross bar 130 to define the tab opening. The cross bar 130 is secured to the posts 128 with suitable connectors 132. The revised bracket 126 allows for better manufacturability. As shown in FIG. 7, a seal 134 may be positioned between the base and the connection plate.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A quick connect joint for connecting a first part to a second part, the quick connect joint comprising:
    a base securable to the first part, the base including an engaging surface with a T-bar slot defined in the engaging surface, and the base including a tab opening defined by a bracket extending from the engaging surface;
    a connection plate securable to the second part, the connection plate including a tab member engageable with the bracket in the tab opening of the base; and
    a cam latch extending through the connection plate, the cam latch including a cam actuator on one side of the connection plate coupled with a T-bar and a T-bar shaft on an opposite side of the connection plate, wherein the T-bar shaft is positionable in the T-bar slot with the T-bar on a side of the base opposite from the engaging surface, and wherein the cam actuator is displaceable between a release position in which the T-bar is disengaged from the base and a lock position in which the T-bar is engaged with the base.

2. A quick connect joint according to claim 1, wherein the cam actuator is rotatable between an insert position in which the T-bar is aligned with a longitudinal axis of the T-bar slot and a connect position in which the T-bar is not aligned with the longitudinal axis of the T-bar slot.

3. A quick connect joint according to claim 1, wherein one of the base and the connection plate comprises an insert member, and wherein the other of the base and the connection plate comprises an insert opening, the insert member engaging the insert opening when the connection plate is coupled with the base.

4. A quick connect joint according to claim 1, wherein the bracket defining the tab opening is integral with the base.

5. A quick connect joint according to claim 1, wherein the tab member includes a groove on an upper surface, the groove being engageable with the bracket.

6. A quick connect joint according to claim 1, wherein the base comprises a base socket with internal threads for connecting to the first part, and wherein the connection plate comprises a connection plate socket with internal threads for connecting to the second part.

7. A quick connect joint according to claim 1, wherein the tab and the cam latch are positioned on opposite sides of the connection plate.

8. A quick connect joint according to claim 1, wherein the cam actuator comprises a cam handle coupled with a cam member, and wherein the cam latch further comprises a cam insert positioned between the cam member and the connection plate and engaged with the cam member, the cam member and the cam insert being cooperatively shaped such that rotation of the cam member relative to the cam insert draws the T-bar shaft and the T-bar toward the cam member.

9. A quick connect joint according to claim 1, wherein the connection plate comprises a seal on an underside thereof facing the engaging surface of the base.

10. A quick connect joint according to claim 1, wherein the base comprises at least one pad secured on the engaging surface.

11. A method of securing a quick connect joint including a base with a T-bar slot and a tab opening, a connection plate with a tab member, and a cam latch extending through the connection plate and including a cam actuator on one side of the connection plate coupled with a T-bar and a T-bar shaft on an opposite side of the connection plate, the method comprising:
 (a) inserting the tab member of the connection plate into the tab opening of the base;
 (b) with the cam latch in a release position, pivoting the connection plate into engagement with the base and inserting the T-bar shaft into the T-bar slot; and
 (c) displacing the cam latch from the release position to a lock position to thereby draw the T-bar into engagement with the base.

12. A method according to claim 11, wherein step (b) is practiced with the cam actuator in a release position such that the T-bar is aligned with a longitudinal axis of the T-bar slot, the method further comprising, before step (c), rotating the cam actuator from the release position to a connect position in which the T-bar is not aligned with the longitudinal axis of the T-bar slot.

13. A method according to claim 12, further comprising engaging a groove in an upper surface of the tab with the tab opening in the base.

14. A method according to claim 11, further comprising sealing the engagement between the connection plate and the base.

15. A method according to claim 11, wherein one of the base and the connection plate comprises an insert member, and the other of the base and the connection plate comprises an insert opening, and wherein step (b) further comprises engaging the insert member with the insert opening.

16. A quick connect joint comprising:
 a base including first and second lock receivers on opposite sides of the base; and
 a connection plate including first and second engagement members engageable with the first and second lock receivers, respectively,
 wherein the first lock receiver includes a slot through the base, wherein the first engagement member includes a shaft insertable into the slot, wherein the first engagement member is displaceable between a release position and a lock position with the shaft inserted into the slot, wherein the base comprises a cylindrical insert member protruding from an engaging surface of the base, and wherein the connection plate comprises an insert opening that is sized to receive the insert member, the insert member engaging the insert opening when the connection plate is engaged with the base.

17. A quick connect joint according to claim 16, wherein the second engagement member comprises a tab member, and wherein the second lock receiver comprises a tab opening defined by a bracket.

18. A quick connect joint according to claim 17, wherein the bracket comprises posts extending from the base and a cross bar secured on the posts.

19. A quick connect joint according to claim 16, wherein the first lock receiver comprises a cam groove, and wherein the first engagement member comprises a cam engageable with the groove in the lock position.

20. A quick connect joint according to claim 19, wherein the first engagement member comprises the cam disposed at a distal end of a rotatable lever.

21. A quick connect joint according to claim 20, wherein the connection plate comprises a plate pair disposed on opposite sides of the rotatable lever and including through holes, and wherein the lever comprises a locking hole that is positioned in alignment with the through holes in the plate pair in the lock position.

* * * * *